United States Patent
Laserson

(10) Patent No.: US 11,823,139 B2
(45) Date of Patent: Nov. 21, 2023

(54) IMAGE-BASED TRANSACTION PROCESSING

(71) Applicant: NCR Corporation, Atlanta, GA (US)

(72) Inventor: Itamar David Laserson, Givat Shmuel (IL)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/261,235

(22) Filed: Jan. 29, 2019

(65) Prior Publication Data

US 2020/0242582 A1 Jul. 30, 2020

(51) Int. Cl.

| | |
|---|---|
| *G06Q 20/00* | (2012.01) |
| *G06Q 20/04* | (2012.01) |
| *G06Q 20/32* | (2012.01) |
| *G06F 3/0482* | (2013.01) |
| *G06T 7/13* | (2017.01) |
| *G06V 30/416* | (2022.01) |
| *G06K 7/14* | (2006.01) |
| *G06V 30/10* | (2022.01) |
| *H04N 23/60* | (2023.01) |

(52) U.S. Cl.
CPC ......... *G06Q 20/047* (2020.05); *G06F 3/0482* (2013.01); *G06Q 20/045* (2013.01); *G06Q 20/327* (2013.01); *G06T 7/13* (2017.01); *G06V 30/416* (2022.01); *G06K 7/1413* (2013.01); *G06K 7/1417* (2013.01); *G06V 30/10* (2022.01); *H04N 23/64* (2023.01)

(58) Field of Classification Search
USPC .......................................................... 705/41
See application file for complete search history.

(56) References Cited

U.S. PATENT DOCUMENTS

| 9,082,007 | B2 * | 7/2015 | Smith ..................... G06T 11/00 |
| 2015/0254628 | A1 * | 9/2015 | Bell ..................... G06Q 20/202 |
| | | | 705/24 |
| 2016/0104189 | A1 * | 4/2016 | Marcus ................ G06Q 20/209 |
| | | | 705/14.34 |

(Continued)

FOREIGN PATENT DOCUMENTS

GB        2604116 A  *  8/2022  .............. G06F 11/08

OTHER PUBLICATIONS

This year, waiters face a tough customer: the IRS Foster, Catherine. The Christian Science Monitor; Boston, Mass. [Boston, Mass]Apr. 13, 1983 https://www.proquest.com/docview/1037905962/478D61984AF84B3FPQ/8?accountid=14753 (Year: 1983).*

(Continued)

*Primary Examiner* — Bruce I Ebersman
*Assistant Examiner* — Hatem M Ali
(74) *Attorney, Agent, or Firm* — Schwegman Lundberg & Woessner, P.A.

(57) ABSTRACT

An image of a transaction receipt is obtained and optical character recognition (OCR) is processed on the image to identify a transaction identifier, a transaction total, and a handwritten amount associated with a transaction. When a confidence value associated with the OCR is above a threshold value, the handwritten amount is processed automatically through a transaction interface for the transaction to update the transaction total for the transaction.

9 Claims, 4 Drawing Sheets

(56) References Cited

U.S. PATENT DOCUMENTS

2018/0025340 A1* 1/2018 Schlosser .............. G06Q 50/12
 705/24
2019/0080325 A1* 3/2019 Pourfallah ............. G06Q 40/02

OTHER PUBLICATIONS

Tips on Tip Allocation Tarras, John. Restaurant Management; Cleveland vol. 2, Iss. 4, (Apr. 1988): 29 https://www.proquest.com/docview/215047345/478D61984AF84B3FPQ/11?accountid=14753 (Year: 1988).*

Will waiters' tips slip when owners' profits dip? Belsize, Laurent. The Christian Science Monitor; Boston, Mass. [Boston, Mass]May 23, 1988. https://www.proquest.com/docview/1034484546/478D61984AF84B3FPQ/12?accountid=14753 (Year: 1988).*

Authors: Annu Lambora: Implementation of Wireless Menu Using IoT; IEEE Conference Paper: IEEE Splore: Publication Date: Feb. 1, 2019 Electronic Publication Date: Oct. 7, 2019 (Year: 2019).*

Authors: Kunal Gupta: Design and Implementation of Wireless Menu Card:; IEEE Conference Paper: IEEE Xplore: Last Update Date: Nov. 21, 2014 Publication Date: Sep. 1, 2014 (Year: 2014).*

Authors: Annu Lambora: Implementation of Wireless Menu Using IoT; IEEE Conference Paper: IEEE Splore: Publication Date: Feb. 1, 2019 Electronic Publication Date: Oct. 7, 2019 (Year: 2019) (Year: 2019).*

Authors: Kunal Gupta: Design and Implementation of Wireless Menu Card:; IEEE Conference Paper: IEEE Xplore: Last Update Date: Nov. 21, 2014 Publication Date: Sep. 1, 2014 (Year: 2014) (Year: 2014).*

1. Authors: Himel Dev et al; Title: Profiling US Restaurants from Billions of Payment Card Transactions; IEEE Xplore; Publication Date: Oct. 1, 2020; (Year: 2020).*

1. Author: Itina Sakharova ; Title: Payment card fraud: Challenges and solutions; Publication: IEEE; Date of Conference: Jun. 11-14, 2012 (Year: 2012).*

2. Authors et al: Jing Liu; Title: A Survey of Payment Card Industry Data Security Standard; IEEE Xplore; Date of Publication: Apr. 26, 2010; (Year: 2010).*

* cited by examiner

IMAGE-BASED TRANSACTION PROCESSING

BACKGROUND

Enterprises and consumers have embraced technological improvements with enthusiasm. Transactions are almost entirely processed over network-based connections from a plurality of disparate devices located anywhere.

However, some transactions remain problematic in the industry and have not benefitted from technological advancements in any significant manner. These transactions typically rely on handwritten details; such transactions still must be manually read and keyed into terminal interfaces in order to be completed and consummated between all interested parties. As a result, a significant amount of time and money are expended in the industry on finalizing these transactions.

SUMMARY

In various embodiments, methods and a system for image-based transaction processing are presented.

According to an embodiment, a method for image-based transaction processing is presented. Specifically, and in one embodiment, an image associated with a transaction receipt for a transaction is obtained. A transaction identifier and a transaction total are identified from the image. A determination is made as to whether the transaction total is to be adjusted based on a handwritten amount recognized in the image. The transaction is completed with the handwritten amount added to the transaction total through interaction with a transaction interface associated with an electronic payment system (EPS) based on the transaction identifier.

DETAILED DESCRIPTION

Figure 1:
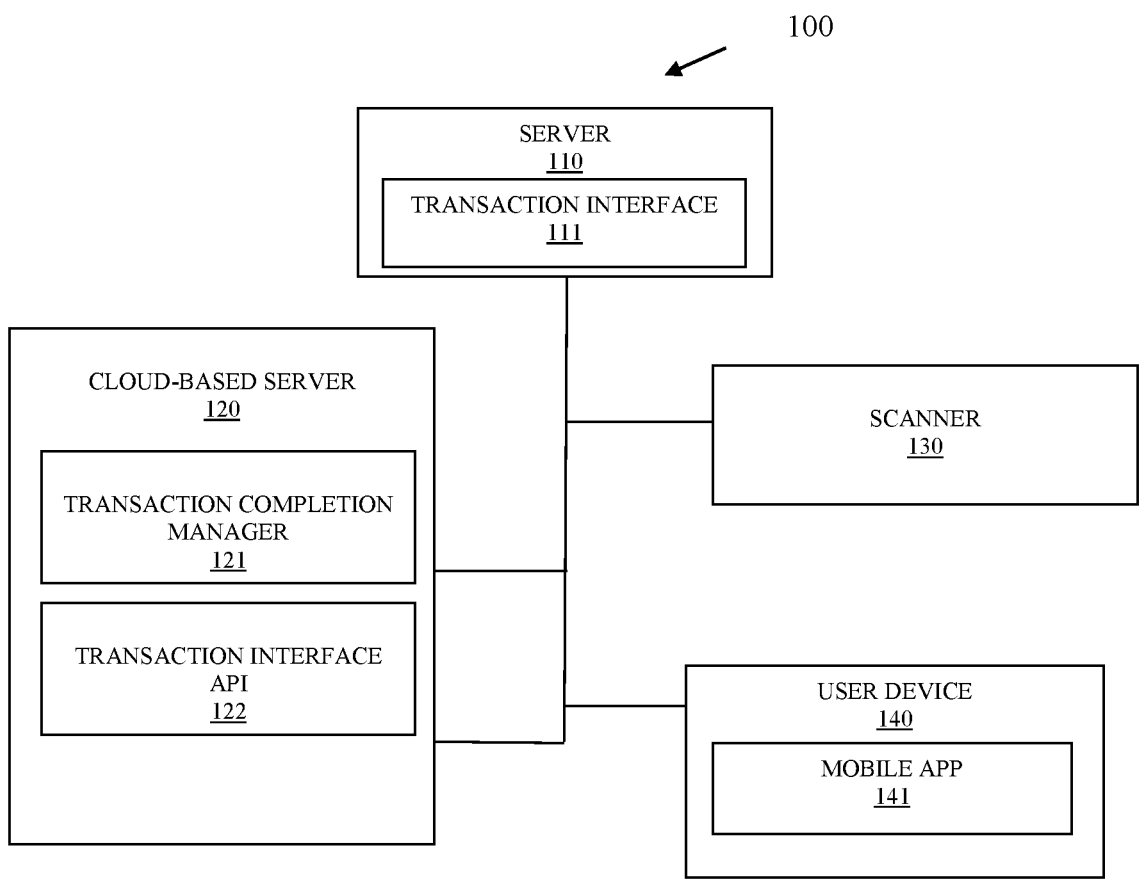
FIG. 1 is a diagram of a system for image-based transaction processing, according to an example embodiment.

FIG. 1 is a diagram of a system 100 for image-based transaction processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of image-based transaction processing presented herein and below.

The system 100 includes a store server 110 having a transaction interface 111; a cloud-based server 120 having a transaction completion manager 121 and a transaction interface Applicant Programming Interface (API); optionally, a network-accessible scanner 130; and a user device 140 having a mobile application (app) 141.

The components 111, 121, 122, and 141 are provided as executable instructions that reside in non-transitory computer-readable storage mediums and are executed from those mediums by hardware processors on their respective devices 110, 120, and 140.

As discussed above, certain transaction types require specialized manual processing for completion. One such transaction type is a tip left on a receipt for a waiter/waitress. Today, U.S. restaurants waste considerable working hours by manually inserting hundreds of tips per day. Manual tip inserts also make restaurants vulnerable to "restaurant tip fraud"—incidents where attendants, attempt to illegally increase their income by deliberately recording an incorrect (higher) tip amount. 15-20% of the income in the U.S. hospitality market is based on tips. 80% of the tips are tendered in credit cards. In the U.S. hospitality market, credit card payments are processed in multiple phases. First, the card is used to pay for the check. The tip amount is then handwritten by the customer on the receipt of the Electronic Payment System's (EPS). Later in the day, the attendant manually inserts the handwritten tip amount to the Point of Sale (POS) terminal initiating a tip adjustment transaction on the EPS system.

The outcome is that as their shift progress, attendants accumulate a "pile" of EPS slips with handwritten tips captured in them. In current hospitality solutions, the attendants are required to find a time to manually insert them, one by one. This can be done either during or at the end of their shift. This operation causes considerable time and money waste to the restaurant. Today, adding tips is not a simple task. An attendant would have to take the following steps to insert their card tips:

1. Login to the POS and navigate to a dedicated screen. Screen presents a long list of all the credit payments received by the attendant.
2. Take one EPS paper slip from a pile and manually locate its' relevant line on the list, by matching between a certain identifier that appears both on the slip and on each line on the screen. (This identifier could be, for example: EPS transaction sequence identifier or the card's last 4 digits.)
3. Manually key in the tip amount that was handwritten on the slip by the customer.
4. Repeat steps 2-4 for each payment slip (could be dozens per day).

This causes significant losses to the restaurant for the following reasons:

1. Waste of working hours: The process wastes considerable time and effort. Adding a single tip in conventional interfaces would take 10-15 seconds for an experienced employee or up to even 60 seconds for an inexperienced employee (25 seconds in average is a conservative assumption). If an average restaurant produces 560 card tips per day, a daily loss of 3.88 working hours per day and a yearly loss of 1420 working hours are estimated. A by-product of the waste in working hours is hardware use. The time spent at the POS terminal on tip insert entails additional hardware cost on the restaurant.
2. Restaurant Tip Fraud: Inserting tips manually makes the restaurant vulnerable to restaurant tip fraud. When detected by the customer, these events may cause severe reputational damage to the restaurant.
3. Training Loss—Tip entry is considered a relatively complex operation for a restaurant attendant. Since restaurant employee turnover rates is high, training tip entry methods to new employees is a significant overhead for restaurants.

All of these aforementioned problems are addressed by the system 100 and the methods presented herein.

There are two modes that the system 100 can be operated within. The first mode is a mobile-device mode and the second mode is a scanner-based batch mode.

Mobile-Device Mode

In the mobile-device mode, when the attendant picks up a transaction receipt and sees that a tip has been added by handwriting of the customer on the receipt. The attendant launches the app 141 on the attendant's device 140 and uses a feature of the app's interface to snap a picture of the receipt. The app 141 automatically transfers the image of the receipt having the tip to the transaction completion manager 121 of the cloud-based server 120. The app 141 then asks the attendant through the app interface whether there are more tips (receipts) to process or not, this continues until the attendant indicates that a last receipt is processed.

The transaction completion manager 121 then applies optical character recognition (OCR) on the image or images provided by the app 141. Specialized OCR may be used for specifically recognizing numerical digits and decimal points represented within the images for a tip amount; such as: an assumption as to the location of a decimal point in the tip amount based on the transaction total when such assumption conforms with what is typical customary for a tip percentage based on the transaction total; usage of a dash "-" character, a comma character "," and/or no separator character at all in the tip amount where the proper location for the decimal character can be inferred from the transaction total; using a limited and constrained dictionary of characters to optically recognize based on the fact that the tip amount is a numerical value; etc. Each image is also processed to recognizing the transaction total and a transaction identifier.

Each includes a representation of a transaction identifier for the specific transaction associated with a specific receipt for a specific EPS. In some cases, depending on the retailer, this transaction identifier may be a barcode or a Quick Response (QR) code. The user identifier associated with the device 140 or an account with the cloud-based server 120 may also provide identification of the specific EPS and its transaction interface 111. That is, the manager 121 may provide services for tip transaction processing to a plurality of different retailers.

Once the transaction identifier, transaction total, and the tip amount are recognized through the OCR image processing, the transaction completion manager 121 uses a transaction interface API 122 to interact with the transaction interface 111 of the corresponding EPS and the tip amount is added to the corresponding transaction associated with the transaction identifier.

The transaction completion manager 121 also recognizes two exception situations: a tip amount that exceeds what is normal and customary (such as a tip that exceeds 25% of the transaction total) and markings that appear to be a tip but the numeric value for the tip is unable to be determined from the OCR processing. In a vast majority of cases, the tip amount is determined and processed by the completion manager 121 using the API 122 to insert the tip amount into the EPS using the interface 111.

The exception situations are flagged and batched together for manual verification and/or approval in cases where the tip amount exceeds 25% of the transaction total. A separate workflow associated with mobile app 141 and the manager 121 is provided for user's having authority to approve tips above a predefined percentage of the transaction total (such as managers); this may also be processed once approved or not approved by the manager through the API 122 with the transaction interface 111.

The app 141 may also provide a running total of tips accumulated by the attendant for the day, each individual tip may be listed through the app interface along with a running total. Specific tips may be selectable by the attendant to display the image of the corresponding transaction and tip amount. This also provides the attendant with a mechanism to recall specific transactions throughout the day or inspect tips should a dispute or approval be needed for any given tip amount. Additionally, the app interface may include the attendant's transactions for which the tip was either too high based on what is customary, for which no tip was left, and for which the manager 121 was unable to properly identify the tip amount. Still further, the app interface may permit the attendant to leave a comment associated with the tip, if appropriate, for review by any subsequent manual reviewer.

Scanner-Based Batch Mode

In this mode of operation tips are batched together and scanned via network-accessible scanner 130. The images are stored as collected in a location accessible to the manager 121. The images may be stored in a newly created file location, such that the manager 121 can detect when the files are uploaded from the scanner 130.

The processing of the manager 121 proceeds in a similar manner to flag receipts that have a tip amount that appears to be too high, appear to be missing tips, and/or appear to have no tips at all for manual inspections. Each tip having a determined tip amount is processed through the API 122 with the appropriate transaction interface 111 of the appropriate EPS server 110.

Receipts that the manager 121 believes have acceptable and recognizable tips are separately maintained from the receipts requiring manual approval and/or inspection. Each receipt having the acceptable and recognizable tips are processed iteratively with the interface 111 or if permitted by the EPS provided as one file for processing by the interface 111.

The exceptions that are missing a recognizable tip amount or an uncustomary high tip amount can then be processed either through the app interface of the app 141 or through a web-based interface on a desktop to the manager 121.

Either Mode of Operation

In an embodiment, the manager 121 assigns a confidence value to each processed receipt. A threshold can be set, such as 90%, to determine by the manager 121 when such tip can be processed with the appropriate EPS and when the receipt should be manually processed in some manner.

It is to be noted that in some instances the transaction identifier may be unable to be recognized from a receipt image, these receipt images are also flagged as a separate category that require manual inspection. This can occur for a variety of reasons, such as a drink spilled onto the receipt from which the image was taken, and the like. So, a receipt image having a recognizable tip amount may still be unable to be processed when its transaction identifier was unrecognizable.

Testing on over 140 handwritten tip samples from receipts provided by approximately 70 different individuals were conducted. The samples were selected to simulate real scenarios with randomly generated transaction identifiers and transaction totals. Results from the system 100 were compared against two different handwriting OCR engines. The accuracy rates were approximately 90%. The amount of time required for attendant's to batch and manually enter tips into an EPS versus the approaches discussed herein and above resulted in approximately a 90% reduction in time with the system 100 over the conventional-based approach.

Based on a restaurant having approximately 300 stores, the amount of time saved was calculated to be 1,278 working hours per year, which is roughly $12,700 per year in wage costs for each of the 300 stores. Furthermore, and by using the system, the chain of 300 restaurants may install approximately 75 less point of sales while maintaining the same level of service to their customers. Still further, the system 100 makes restaurant tip fraud much harder and prevents restaurants from costly reputational damage. Once the EPS slips are imaged (by device 140 and/or scanner 130) the images are automatically read, interpreted and processed with EPS transaction interface 111. The system 100 is reusable. The manager 121 is installed in the cloud 120 so it may be used by a plurality of different stores associated with a single chain and a plurality of different stores. The system 100 also increases operability; responsibility moves from multiple restaurant attendants to a single back office employee that can manually inspect roughly 10% of tip receipts that may be unrecognized and flagged by the manager 121. This will dramatically reduce the training effort, especially in an industry with such high turnover as hospitality. Less users also means less Information Technology (IT) incidents generated within an enterprise.

The system 100 also provides new feature function such as the app interface to the app 141 and the ability of attendants to have real-time tip totals and review tips for each receipt directly via their mobile device 140.

In an embodiment, the transaction completion manager 121 resides on the server 110 associated with the EPS of a single enterprise.

In an embodiment, the user device 140 is one of: a phone, a tablet, a laptop, and a wearable processing device.

These and other embodiments are now discussed with reference to the FIGS. 2-4.

Figure 2:
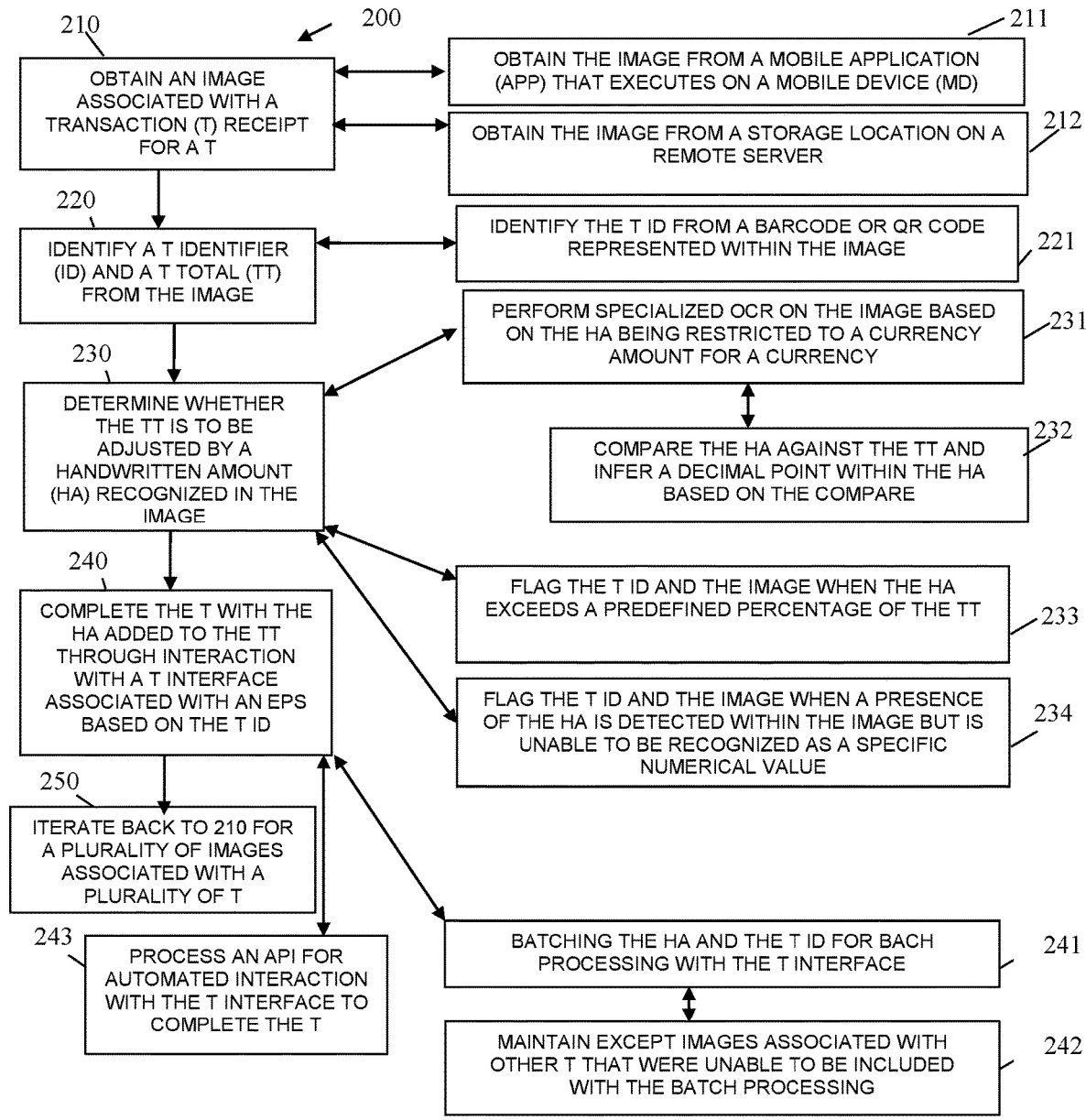
FIG. 2 is a diagram of a method for image-based transaction processing, according to an example embodiment.

FIG. 2 is a diagram of a method 200 for image-based transaction processing, according to an example embodiment. The software module(s) that implements the method 200 is referred to as a "transaction completion manager." The transaction completion manager is implemented as executable instructions programmed and residing within memory and/or a non-transitory computer-readable (processor-readable) storage medium and executed by one or more processors of a device. The processor(s) of the device that executes the transaction completion manager are specifically configured and programmed to process the transaction completion manager. The transaction completion manager has access to one or more network connections during its processing. The network connections can be wired, wireless, or a combination of wired and wireless.

In an embodiment, the device that executes the transaction completion manager is the cloud-based server 120.

In an embodiment, the device that executes the transaction completion manager is server 110.

In an embodiment, the transaction completion manager is all or some combination of the transaction completion manager 121 and the transaction interface API 122.

At 210, the transaction completion manager obtain an image associated with a transaction receipt for a transaction.

In an embodiment, at 211, the transaction completion manager obtains the image from a mobile application that executes on a mobile device.

In an embodiment, at 212, the transaction completion manager obtains the image from a storage location on a remote server.

At 220, the transaction completion manager identifies a transaction identifier and a transaction total from the image.

At 230, the transaction completion manager determines whether the transaction total is to be adjusted by a handwritten amount recognized in the image.

In an embodiment, at 231, the transaction completion manager performs specialized OCR on the image based on the handwritten amount being restricted to a currency amount for a currency.

In an embodiment of 231 and at 232, the transaction completion manager compares the handwritten amount against the transaction total and infers a decimal point within the handwritten amount based on the comparison. This can be done based on an expected and customary percentage of the transaction total or based on no decimal point being present in the handwritten amount or something other than a decimal point used as a delimiter represented within the handwritten amount.

In an embodiment, at 233, the transaction completion manager flags the transaction identifier and the image when the handwritten amount exceeds a predefined percentage of the transaction total (such as what is customary for a tip (15-25%)).

In an embodiment, at 234, the transaction completion manager flags the transaction identifier and the image when a presence of the handwritten amount is detected within the image but is unable to be recognized as a specific numerical value.

At 240, the transaction completion manager completes the transaction with the handwritten amount added to the transaction total through interaction with a transaction interface associated with an EPS based on the transaction identifier for the transaction.

In an embodiment, at 241, the transaction completion manager batches the handwritten amount and the transaction identifier for batch processing with the transaction interface.

In an embodiment, at 242, the transaction completion manager maintains exception images associated with other transactions that were unable to be included with the batch processing.

In an embodiment, at 243, the transaction completion manager processes an API for automated interaction with the transaction interface to complete the transaction.

In an embodiment, at 250, the transaction completion manager iterates back to 210 for a plurality of images associated with a plurality of other transactions having other handwritten amounts.

In an embodiment, the transaction completion manager maintains running daily totals for tip amounts associated with each user for payroll and tax compliance.

Figure 3:
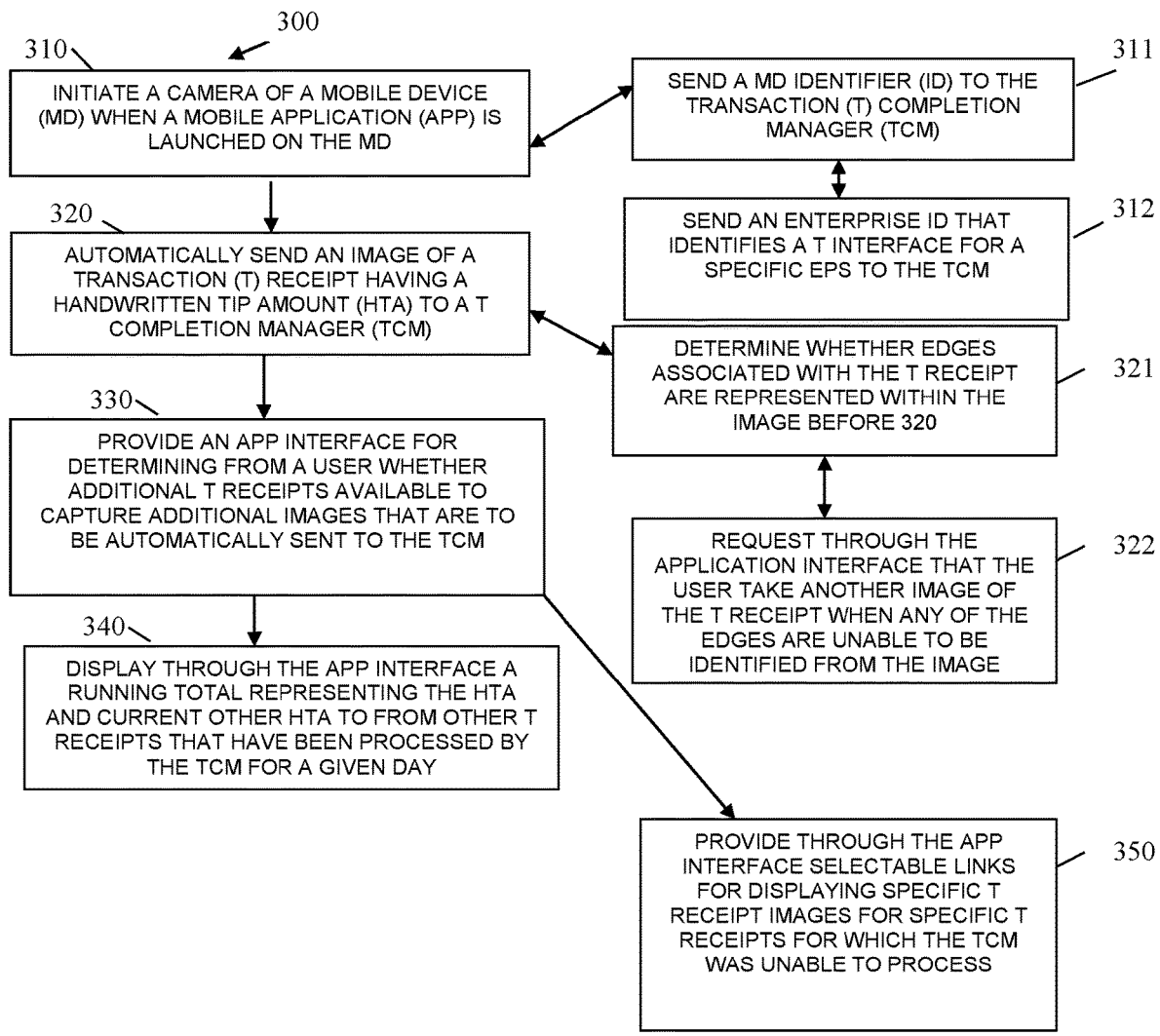
FIG. 3 is a diagram of another method for image-based transaction processing, according to an example embodiment.

FIG. 3 is a diagram of another method 300 for image-based transaction processing, according to an example embodiment. The software module(s) that implements the method 300 is referred to as a "mobile transaction completion application (app)." The mobile transaction completion app is implemented as executable instructions programmed and residing within memory and/or a non-transitory computer-readable (processor-readable) storage medium and executed by one or more processors of a device. The processors that execute the item mobile transaction completion app are specifically configured and programmed to process the mobile transaction completion app. The mobile transaction completion app has access to one or more network connections during its processing. The network connections can be wired, wireless, or a combination of wired and wireless.

In an embodiment, the device that executes the mobile transaction completion app is the user device 140. In an embodiment, the user device 140 is one of: a phone, a tablet, and a wearable processing device.

In an embodiment, the mobile transaction completion app is the mobile app 141 discussed above with the FIG. 1.

The mobile transaction completion app interacts with the transaction completion manager 121 and/or the method 200 for completing processing on a transaction.

At 310, the mobile transaction completion app initiates a camera of a mobile device when the mobile transaction completion app is launched on the mobile device for execution (e.g., when open or selected from a mobile device interface).

In an embodiment, at 311, the mobile transaction completion app sends a mobile device identifier to a transaction completion manager (such as transaction completion manager 121 and/or the method 200) when launched.

In an embodiment of 311 and at 312, the mobile transaction completion app sends an enterprise identifier that identifies a transaction interface for a specific electronic payment system (EPS) to the transaction completion manager.

At 320, the mobile transaction completion app automatically sends an image of a transaction receipt having a handwritten tip amount to the transaction completion manager when the camera is activated by an operator of the mobile device to capture the image from the camera.

In an embodiment, at 321, the mobile transaction completion app determines whether edges associated with the transaction receipt are represented within the image before automatically sending the image at 321.

In an embodiment of 321 and at 322, the mobile transaction completion app requests through the application interface of the mobile transaction completion app that the user take another image of the transaction receipt when any of the edges are unable to be identified in the image or when the image lacks a quality value set in the mobile transaction completion or required by the transaction completion manager.

At 330, the mobile transaction completion app provides the application interface to the mobile transaction completion app for determining whether a user (who is operating the mobile device) wants to process additional transaction receipt by capturing additional images for sending to the transaction completion manager.

In an embodiment, at 340, the mobile transaction completion app displays through the application interface a running total representing the handwritten tip amount and current other handwritten tip amounts that have been processed by the transaction completion manager for a given day. In an embodiment, the application interface permits the user to define a period of time or dates for receiving a total.

In an embodiment, at 350, the mobile transaction completion app provides through the application interface selectable links for displaying specific transaction receipt images for specific transaction receipts for which the transaction completion manager was unable to process.

Figure 4:
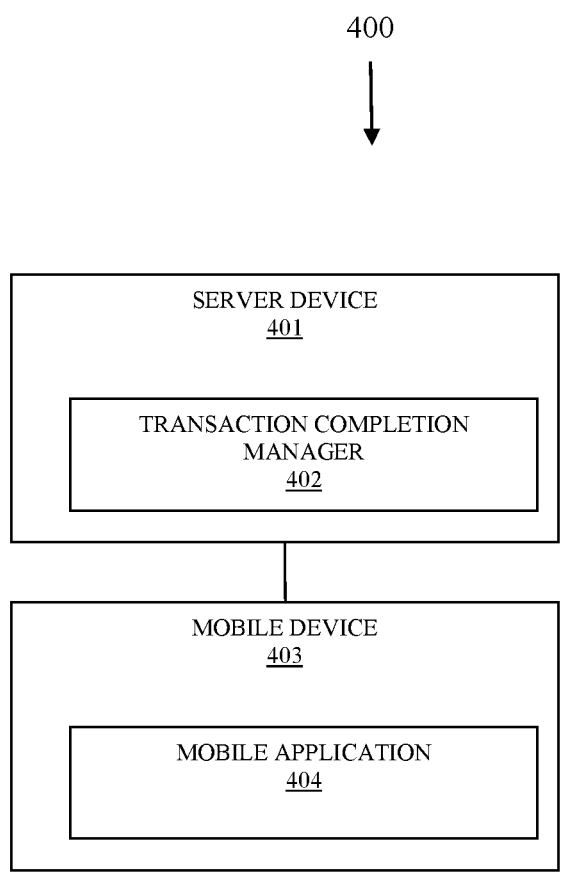
FIG. 4 is a diagram of a system for image-based transaction processing, according to an example embodiment.

FIG. 4 is a diagram of a system 400 for image-based transaction processing, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a server device 401 and a mobile device 403. The server device 401 includes executable instructions residing in a non-transitory computer-readable storage medium representing a transaction completion manager 402, which is executed by a hardware processor of the server device 401. The mobile device 403 includes executable instructions residing in a non-transitory computer-readable storage medium representing a mobile app 404, which is executed by a hardware processor of the mobile device 403.

In an embodiment, the transaction completion manager 402 is all or some combination of the transaction completion manager 121 and/or the method 200.

In an embodiment the mobile app 404 is all or some combination of the mobile app 141 and/or the method 300.

The mobile app 404, when executed by the hardware processor of the mobile device 401 from the non-transitory computer-readable storage medium, is configured to: initiate a camera when the mobile application 404 is launched for execution on the mobile device 403 and automatically send an image captured by the camera as a transaction receipt having a handwritten tip to the transaction completion manager 402.

The transaction completion manager 402, when executed by the hardware processor of the server device 401 from the non-transitory computer-readable storage medium, is configured to: identify a user associated with the mobile device 403 on receipt of the image from the mobile application 404, perform optical character recognition on the image to identify a transaction identifier, a transaction total, and the handwritten tip, and interact with a transaction interface of an electronic payment system to update the transaction total to include the handwritten tip using the transaction identifier.

In an embodiment, the transaction completion manager 402 is further configured to perform processing to: maintain exception images from received transaction receipt images for which the transaction completion manager 402 was unable to identify at least one of: a transaction identifier, a transaction total, and the handwritten tip.

It is to be noted that although the various examples presented were within the context of online middleware food service providers, other embodiments of the invention are not so limited, such that any retailer middleware service that sells products other than food can benefit from the teachings presented herein and above.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   providing a processor of a cloud-based server executable instructions from a non-transitory computer-readable storage medium causing the processor to perform processing comprising:
   obtaining an image associated with a transaction receipt for a transaction;
   identifying from the image a transaction identifier, and a transaction total and an electronic payment system (EPS) associated with the transaction receipt, wherein identifying further includes identifying the transaction identifier from a barcode or Quick Response (OR) represented within the image;
   determining whether the transaction total is to be adjusted based on a handwritten amount recognized in the image by processing a specialized Optical Character Recognition (OCR) that makes an assumption as to a location of a decimal point to identify a tip amount from the handwritten amount in order to revise the transaction total by the tip amount using the transaction total and an expected percentage for the tip amount and numerical digits identified in the handwritten amount wherein when the handwritten amount includes no separator character at all in the numerical digits, wherein determining further includes performing specialized OCR on the image based on the handwritten amount being restricted to a currency amount for a currency;
   completing the transaction with the handwritten amount added to the transaction total through interaction with a transaction interface associated with the EPS based on the transaction identifier;
   interacting with an application interface of a mobile application that provided the image of the transaction receipt and based on the interacting providing a running total for processed tips for a given day for a given attendant, providing specific transactions and corresponding specific tips, providing particular transactions for which there were given tip amounts that were above what is considered customary and for which there were no tips given at all, and further based on the interacting recording comments provided by the given attendant through the mobile application on attendant identified transactions;
   operating the cloud-based server executable instructions in a mobile device mode of operation, wherein during the mobile device mode of operation individual transaction receipts are processed in real time
   operating the cloud-bases server executable instructions in a scanner-based batch mode of operation, wherein during the scanner-based batch mode of operation the individual transaction receipts are stored and processed in batches;
   maintaining certain receipts that exceed a threshold amount for confirmation and providing a listing of the certain receipts through the transaction interface; and
   processing the method without requiring manual interaction with the EPS system by the given attendant.

2. The method of claim 1 further comprising, iterating back to the obtaining for a plurality of images associated with a plurality of transactions.

3. The method of claim 1, wherein determining further includes flagging the transaction identifier and the image when the handwritten amount exceeds a predefined percentage of the transaction total.

4. The method of claim 1, wherein determining further includes flagging the transaction identifier and the image when a presence of the handwritten amount is detected within the image but is unable to be recognized as a specific numerical value.

5. The method of claim 1, wherein completing further includes batching the handwritten amount, the transaction identifier, and the image for batch processing with the transaction interface during the scanner-batch mode of operation.

6. The method of claim 5, wherein batching further includes maintaining exception images associated with other transactions that were unable to be included with the batch processing.

7. The method of claim 1, wherein completing further includes process an Application Programming Interface (API) for automated interaction with the transaction interface to complete the transaction.

8. A system, comprising:
   a server device having at least one processor configured to execute instructions from a non-transitory computer-readable storage medium, the instructions representing a transaction completion manager;
   a mobile device having at least one processor configured to execute instructions from a non-transitory computer-readable storage medium, the instructions representing a mobile application;
   the mobile application is provided to the at least one processor of the mobile device causing the at least one processor of the mobile device to perform processing to:
   initiate a camera when the mobile application is launched for execution on the mobile device, automatically send an image captured by the camera as a transaction receipt having a handwritten tip to the transaction completion manager, and process an application interface to the service device; and
   the transaction completion manager is provided to the at least one processor of the server device causing the at least one processor of the server device to perform processing to:
   identify a user associated with the mobile device on receipt of the image from the mobile application, identify a transaction identifier from a barcode or Quick Response (OR) represented within the image, perform optical character recognition on the image to identify a transaction identifier, a transaction total, an electronic payment system (EPS), and the handwritten tip, determine the handwritten tip by processing a specialized Optical Character Recognition (OCR) on the image based on the handwritten tip being restricted to a currency amount for a currency and that makes an assumption as to a location of a decimal point to identify a tip amount from the handwritten tip in order to revise the transaction total by the tip amount using the transaction total and an expected percentage for the tip amount and numerical digits identified in the handwritten tip, wherein when the handwritten tip includes no separator character at all in the handwritten tip, interact with a transaction interface of the EPS to update the transaction total to include the handwritten tip using the transaction identifier;

interact with the application interface of the mobile application and based on interactions with the application interface provide a running total for processed tips for a given day for the user, provide specific transactions and corresponding specific tips, provide particular transactions for which there were given tip amounts that were above what is considered customary and for which there were no tips given at all, further based on the interactions with the application interface record comments provided by the user through the mobile application on user identified transactions, and to operate in a mobile device mode of operation and to operate in a scanner-based batch mode of operation, wherein during the mobile device mode of operation individual transaction receipts are processed in real time and during the scanner-based batch mode of operation the individual transaction receipts are stored and processed in batches;

maintain certain receipts that exceed a threshold amount for confirmation and providing a listing of the certain receipts through the transaction interface; and process the transaction completion manager without requiring manual interaction with the EPS by the user.

9. The system of claim 8, wherein the transaction completion manager is further configured to perform processing to: maintain exception images from received transaction receipt images for which the transaction completion manager was unable to identify at least one of: a transaction identifier, a transaction total, and the handwritten tip.

* * * * *